United States Patent
Zhang et al.

(10) Patent No.: US 9,093,092 B1
(45) Date of Patent: Jul. 28, 2015

(54) DSA SUSPENSION HAVING A FLEXURE GIMBAL ASSEMBLY WITH MOMENT-BALANCED SECTIONS

(71) Applicant: Magnecomp Corporation, Murrieta, CA (US)

(72) Inventors: Long Zhang, Murrieta, CA (US); Peter Hahn, Wildomar, CA (US); Kuen Chee Ee, Chino, CA (US); Markus E. Mangold, Ayutthaya (TH)

(73) Assignee: MAGNECOMP CORPORATION, Murrieta, CA (US)

( * ) Notice: Subject to any disclaimer, the term of this patent is extended or adjusted under 35 U.S.C. 154(b) by 0 days.

(21) Appl. No.: 14/489,454

(22) Filed: Sep. 17, 2014

Related U.S. Application Data

(60) Provisional application No. 61/880,084, filed on Sep. 19, 2013.

(51) Int. Cl.
*G11B 5/48* (2006.01)
(52) U.S. Cl.
CPC .............. *G11B 5/4873* (2013.01); *G11B 5/482* (2013.01)
(58) Field of Classification Search
USPC ........................................... 360/294.1, 245.4
See application file for complete search history.

(56) References Cited

U.S. PATENT DOCUMENTS

| | | | |
|---|---|---|---|
| 5,854,721 A | 12/1998 | Lim | |
| 6,502,300 B1 | 1/2003 | Casey et al. | |
| 7,328,118 B2 | 2/2008 | Liu et al. | |
| 7,663,841 B2 | 2/2010 | Budde et al. | |
| 8,107,198 B1* | 1/2012 | Ee ............................. | 360/245.7 |
| 2001/0050828 A1* | 12/2001 | Davis et al. ................ | 360/97.01 |
| 2006/0274453 A1* | 12/2006 | Arya ......................... | 360/245.3 |
| 2012/0287536 A1* | 11/2012 | Kuwajima ................. | 360/234.3 |
| 2014/0168813 A1* | 6/2014 | Tao et al. ........................ | 360/75 |

* cited by examiner

*Primary Examiner* — Wayne Young
*Assistant Examiner* — Carlos E Garcia
(74) *Attorney, Agent, or Firm* — Intellectual Property Law Offices of Joel Voelzke, APC

(57) ABSTRACT

In a gimbal dual stage actuated suspension, the gimbal including the head slider is moment-balanced about the load beam dimple thus reducing sway mode gain. In a ring gimbal suspension the T-limiter can be removed and replaced with an extended gimbal tongue including the same layers of insulating material and copper that are part of flexure's flexible circuit, thus allowing the moment-balancer to be formed integrally with the rest of the flexure as part of the standard flexure manufacturing process. Additionally, the traces of the flexible circuit can be made to run at least partially underneath the head slider and approach the slider bond pads from the proximal side of the suspension, thereby shifting weight toward the proximal side.

16 Claims, 12 Drawing Sheets

DSA SUSPENSION HAVING A FLEXURE GIMBAL ASSEMBLY WITH MOMENT-BALANCED SECTIONS

RELATED APPLICATIONS

This application claims priority from U.S. provisional patent application No. 61/880,084 filed Sep. 19, 2013.

BACKGROUND OF THE INVENTION

1. Field of the Invention

This invention relates to the field of suspensions for disk drives. More particularly, this invention relates to the field of a suspension exhibiting reduced sway-mode gain.

2. Description of Related Art

Dual stage actuated (DSA) suspensions are well known in the hard disk drive (HDD) industry. In a DSA suspension, the suspension is not only activated by a voice coil motor which moves the entire suspension, but an additional microactuator is placed on the suspension itself for effecting fine movements of the head slider located at the distal end of the suspension in order to keep it properly aligned over the data track on the spinning disk. As used herein, the term "proximal" means closer to the end of the suspension that is affixed to the disk drive's actuator arm, and "distal" means closer to the cantilevered end of the suspension. The microactuator(s) provide much finer control and much higher bandwidth of the servo control loop than does the voice coil motor alone, which effects relatively coarse movements of the suspension and hence the magnetic head slider. A piezoelectric element, sometimes referred to simply as a PZT, is often used as the microactuator motor, although other types of microactuator motors are possible. In the discussion that follows, for simplicity the microactuator will sometimes be referred to simply as a "PZT," although it will be understood that the microactuator need not be of the PZT type.

FIG. 1 is an oblique view of an exemplary prior art disk drive 100 having a DSA suspension with PZTs mounted at the baseplate. The prior art disk drive unit 100 includes a spinning magnetic disk 101 containing a pattern of magnetic ones and zeroes on it that constitutes the data stored on the disk drive. The storage medium may be other types of storage medium such as optical storage medium in an optical disk drive, but a magnetic disk drive will be used herein for illustration. The magnetic disk is driven by a drive motor (not shown). Disk drive unit 100 further includes a disk drive suspension 105 to which a magnetic head slider (not shown) which defines a read/write head is mounted proximate a distal end of load beam 107 or other beam portion.

Suspension 105 is coupled to an actuator arm 103, which in turn is coupled to a voice coil motor 112 that moves the suspension 105 arcuately in order to position the head slider over the correct data track on data disk 101 or other recording medium. The head slider is carried on a gimbal which allows the slider to pitch and roll so that it follows the proper data track on the disk, allowing for such variations as vibrations of the disk, inertial events such as bumping, and irregularities in the disk's surface.

Without admitting that FIG. 2 is "prior art" within the legal meaning of that term, FIG. 2 is a bottom plan view of a prior suspension 10 by the assignee of the present application. As used herein, the "bottom" of a suspension refers to the side of a suspension on which the head slider 42 is mounted, and which faces the spinning data disk platter 101. A bottom view of a suspension is therefore a view of the slider side. The design shown in the figure employs a PZT microactuator 40 extending from a relatively fixed portion of the suspension to the gimbaled area of flexure gimbal assembly 30.

FIG. 3 is a top oblique view of the suspension 10 of FIG. 2. The two PZTs 40 are arranged to rotate head slider 42 about a center of rotation which is ideally located at dimple 18, when the two PZTs 40 are actuated by driving voltages causing one PZT to extend and the other PZT to contract. Because PZTs 40 are disposed near head slider 42 and act more directly upon the slider without having to move the entire load beam and/or part of the base plate, the gimbal-based DSA suspension of FIGS. 2 and 3 provides a higher servo bandwidth as compared to the base plate mounted DSA suspension of FIG. 1.

FIG. 4 is a graph of frequency response functions (FRFs) of the gimbal-based DSA suspension of FIG. 2 according to a simulation. The line labeled "MP FRF" represents the frequency response at the slider 42 when the suspension is activated at the mount plate by the voice coil motor. The line labeled "PZT FRF" represents the frequency response at the slider 42 when the PZTs 40 are activated. The mount plate excited FRF (MP FRF) and the PZT excited FRF (PZT FRF) each have a major peak at approximately 23 kHz. This peak is referred to as the load beam sway mode. To achieve a higher HDD servo bandwidth in the face of a high mode gain, such as a gain exceeding 20 dB, conventional hard disk drive servo controller loops may employ an additional notch design to filter out this high gain.

Although the gimbal-based DSA suspension of FIG. 3 may obtain a cleaner and lower gain PZT FRF in a low frequency range such as below 20 kHz as compared to the suspension of FIG. 1, the sway mode gain in the PZT FRF may still be relatively high. Thus, there is a need for techniques that reduce sway mode gain in gimbal-based DSA suspensions.

SUMMARY OF THE INVENTION

According to the invention, a flexure gimbal assembly includes different sections that are constructed so that respective rotational moments of the sections are balanced with respect to one another. A front section of a flexure gimbal assembly has a mass-related rotational moment M1 about the center of rotation of the slider which is based on the mass of the front section and the distance between the front section and a rotation center of the slider. Similarly, a rear section of the flexure gimbal assembly has a mass-related rotational moment M2 about the center of rotation of the slider which is based on the mass of the rear section and the distance between the rear section and the rotation center. By balancing the moments M1 and M2 of the front and rear sections, the tendency of the slider to rotate due to the moment imbalance is reduced or eliminated, and accordingly the sway mode gain of the disk drive suspension is reduced.

Exemplary embodiments of the invention will be described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 5:
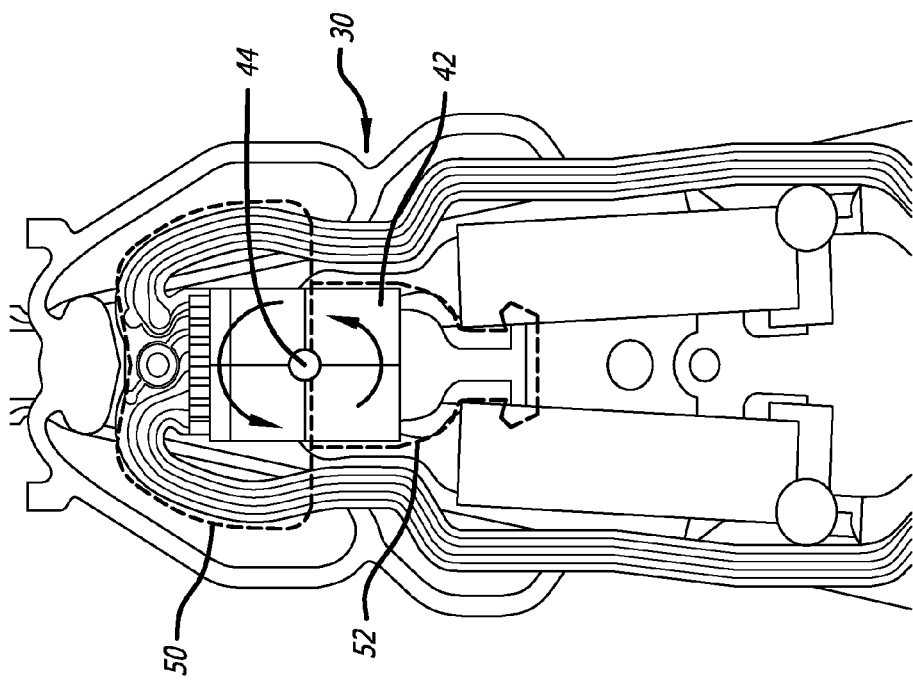
FIG. 5 is a bottom plan view of a suspension including a flexure gimbal assembly, annotated to illustrate front and rear parts of the flexure gimbal assembly.

FIG. 5 is a bottom plan view of a suspension including a flexure gimbal assembly 30. The figure is annotated to illustrate front part 50 and rear part 52 of flexure gimbal assembly 30. A front part 50 of flexure gimbal assembly 30 is indicated by the area encompassed by the dashed line distal of the rotation center 44 of slider 42. A rear part 52 of flexure gimbal assembly 30 adjacent to the front part is indicated by the area encompassed by the dashed line proximal of the rotation center 44 of slider 42.

Figure 6:
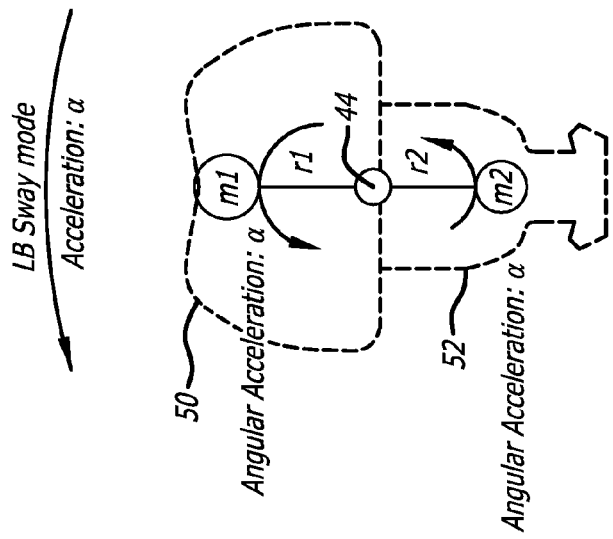
FIG. 6 is a simplified conceptual diagram that illustrates moments of the front and rear parts of the flexure gimbal assembly of FIG. 5.

FIG. 6 is a simplified conceptual diagram that illustrates moments of the front part 50 and rear part 52 of the flexure gimbal assembly 30 of FIG. 5.

The flexure front part 50 distal of the rotation center 44 constitutes a first mass $m_1$, and the flexure rear part 52 proximal of the rotation center 44 constitutes a second mass $m_2$. When the two PZTs 40 are actuated, the flexure front part 50 and the flexure rear part 52 rotate about the slider center. The moment of inertia of the front and rear sections $I_1$ and $I_2$ are described in Equations (1) and (2):

$$I_1 = \int_0^{m_1} r_1^2 dm \quad (1)$$

$$I_2 = \int_0^{m_2} r_2^2 dm \quad (2)$$

where $r_1$ and $r_2$ represent the respective radii from the center of rotation to each differential portion of masses $m_1$ and $m_2$.

Thus, the rotational moment of the front and rear section $M_1$ and $M_2$ are described in Equations (3) and (4):

$$M_1 = I_1 \alpha e \quad (1)$$

$$M_2 = I_2 \alpha e \quad (2)$$

where $\alpha$ is the angular acceleration and e is the unit vector perpendicular to the plane of the pendulum. Since $M_1$ and $M_2$ have identical $\alpha$ and e, their difference will be fully determined by the difference of their respective moment of inertia $I_1$ and $I_2$.

If there is an imbalance or difference between $I_1$ and $I_2$, an interaction force will be generated on the slider rotation center 44, i.e. the load beam dimple. Such a force has components in the direction of x, y and z, as shown in FIG. 5. The component force in the y-direction will cause the load beam 107 to move in the y-direction. Consequently, the suspension of FIG. 5 may exhibit a relatively high PZT FRF gain due to the unbalanced moment between the front and rear sections. In accordance with the teachings herein, this FRF gain can be reduced by balancing the moments of inertia $I_1$ and $I_2$. For example, one or more of the size, shape, or weight of the components of the flexure gimbal assembly can be constructed in a manner that ensures that the moments of inertia proximal and distal of the center of rotation 44 are substantially equal.

The degree to which the moments are balanced depends on the design objectives of a given implementation. In some implementations, moments balanced to within 1% are deemed to be substantially balanced. In these implementations, the flexure gimbal assembly is constructed such that the rotational moments differ by 1% or less. In some implementations, moments balanced to within 2% are deemed to be substantially balanced. In some implementations, moments balanced to within 5% are deemed to be substantially balanced. In some implementations, moments balanced to within 10% are deemed to be substantially balanced. In some implementations, moments balanced to within 20% are deemed to be substantially balanced. It should be appreciated that other degrees of balance may be used in a given implementation.

Figure 7:
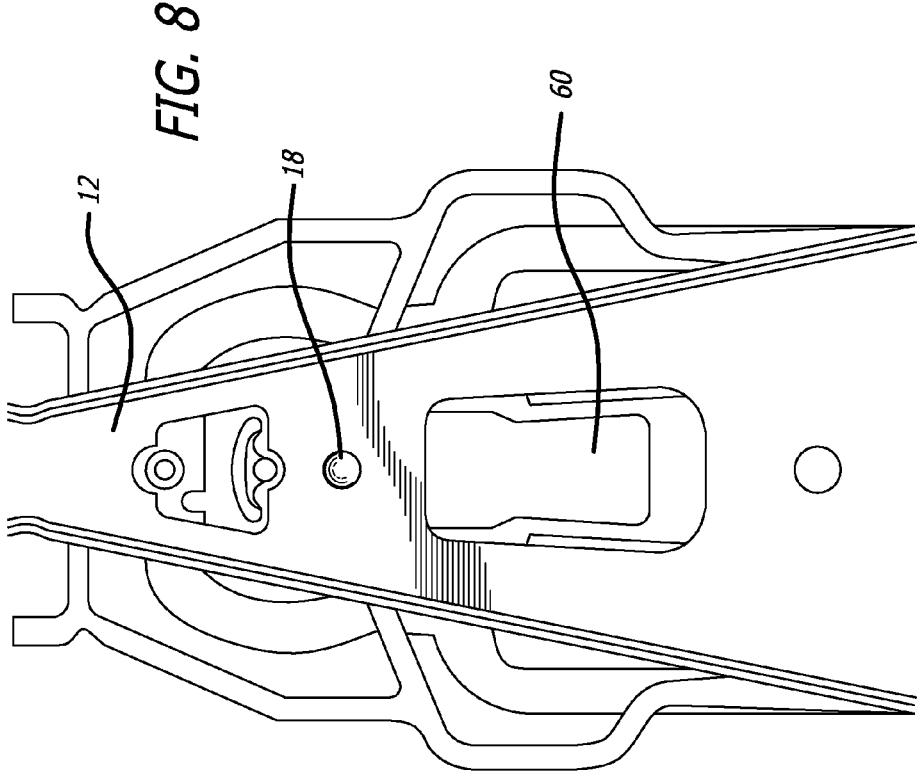
FIG. 7 is a bottom plan view of a suspension including a flexure gimbal assembly in which the flexure gimbal assembly includes a moment balancer according to an illustrative embodiment of the invention.
Figure 8:
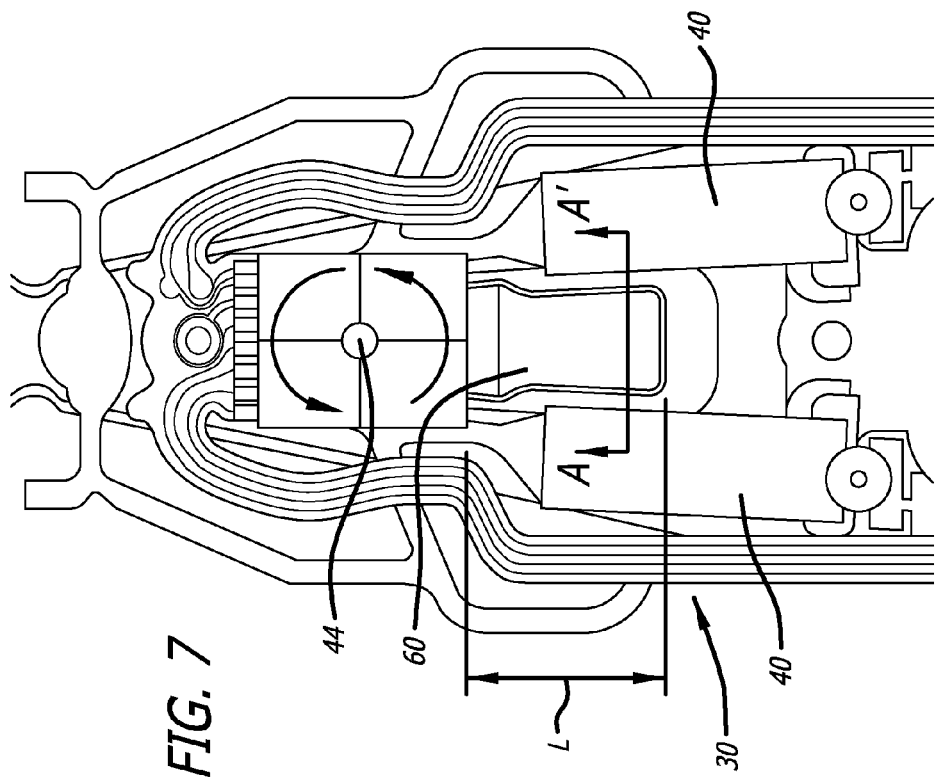
FIG. 8 is a top plan view of the suspension in FIG. 7.

FIG. 7 is a bottom plan view of a suspension including a flexure gimbal assembly in which the flexure gimbal assembly includes a moment balancer 60 according to an illustrative embodiment of the invention. FIG. 8 is a top plan view of the suspension in FIG. 7. In the example of FIG. 7 and FIG. 8, the moment balancer 60 is a large flat part of the flexure that defines an extended portion of the gimbal tongue, extending in a proximal direction from underneath the head slider 42. Many suspensions employ a T-limiter which is a portion of the stainless steel layer of the flexure usually proximal of the head slider that is bent into a T-shape and which engages a portion of the load beam 107. The T-limiter limits vertical displacement of the head slider during shock events and thus helps to avoid damage to the suspension during such shock events. Head slider displacement limiters are often although not always T-shaped. Such limiters, however, often cannot balance the rotational moment, and can even create unexpected and/or undesired modes in the PZT driven FRF. In a ring-gimbal type suspension such as the one shown, the flexure has an extra weld to the load beam on the distal end in order to achieve a function similar to that of a T-limiter during shock events. The extended gimbal tongue of the invention can be used in a suspension that has no leading edge T-limiter 70, with the extended gimbal tongue helping to provide more mass than a T-limiter in order to balance the rotational moment about the head slider, since the distal end of the head slider usually has more mass and thus higher rotational moment.

Figure 9:
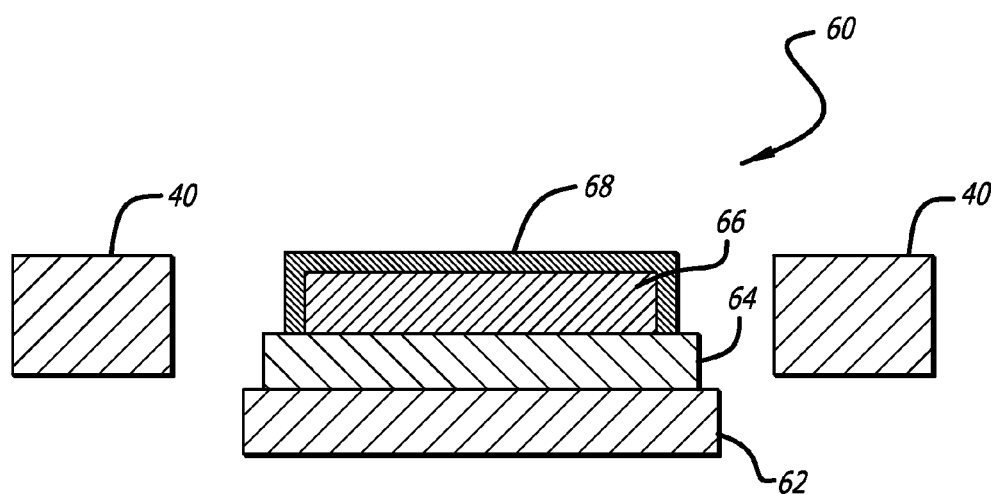
FIG. 9 is a cross-sectional view of the moment balancer area of FIG. 7 taken along section line A-A'.

FIG. 9 is a cross-sectional view of the moment balancer 60 area of FIG. 7 taken along section line A-A'. In the example of FIG. 9, moment balancer 60 is constructed of the same metal support layer 62, insulating layer 64, conductive layer 66 and cover layer 68, of which the flexure is constructed. Those materials are typically stainless steel, polyimide, copper or copper alloy, and polyimide, respectively. Thus, a moment balancer may be constructed of the same materials used to construct other parts of the suspension and may be formed integrally with the flexure as part of the standard flexure manufacturing process. Although the conductive layer 66 such as copper of moment balancer 60 is formed of the same copper conductive layer as in the electrical circuit traces, typically the copper 66 on the moment balancer would not be electrically connected to any of the copper that carries any of the data signals to or from head slider 42. That is, the copper on moment balancer 60 would be electrically isolated from the data signals of the suspension. The reasons would be electrical rather than mechanical, including avoiding impedance discontinuities and avoiding unnecessary radiation. Additionally, the copper on moment balancer 60 is preferably not connected to any voltage supply carried on the suspension's flexible electrical circuit.

The moment balancer 60 is designed so that the rotational moment of inertia $I_1$ of the flexure front part 50 and the rotational moment $I_2$ of the flexure rear part 52 balance with one another under the influence of the load beam sway mode. Consequently, the suspension of FIG. 7 may exhibit a lower PZT FRF gain as compared to a suspension that is not balanced in this manner.

Figure 10:
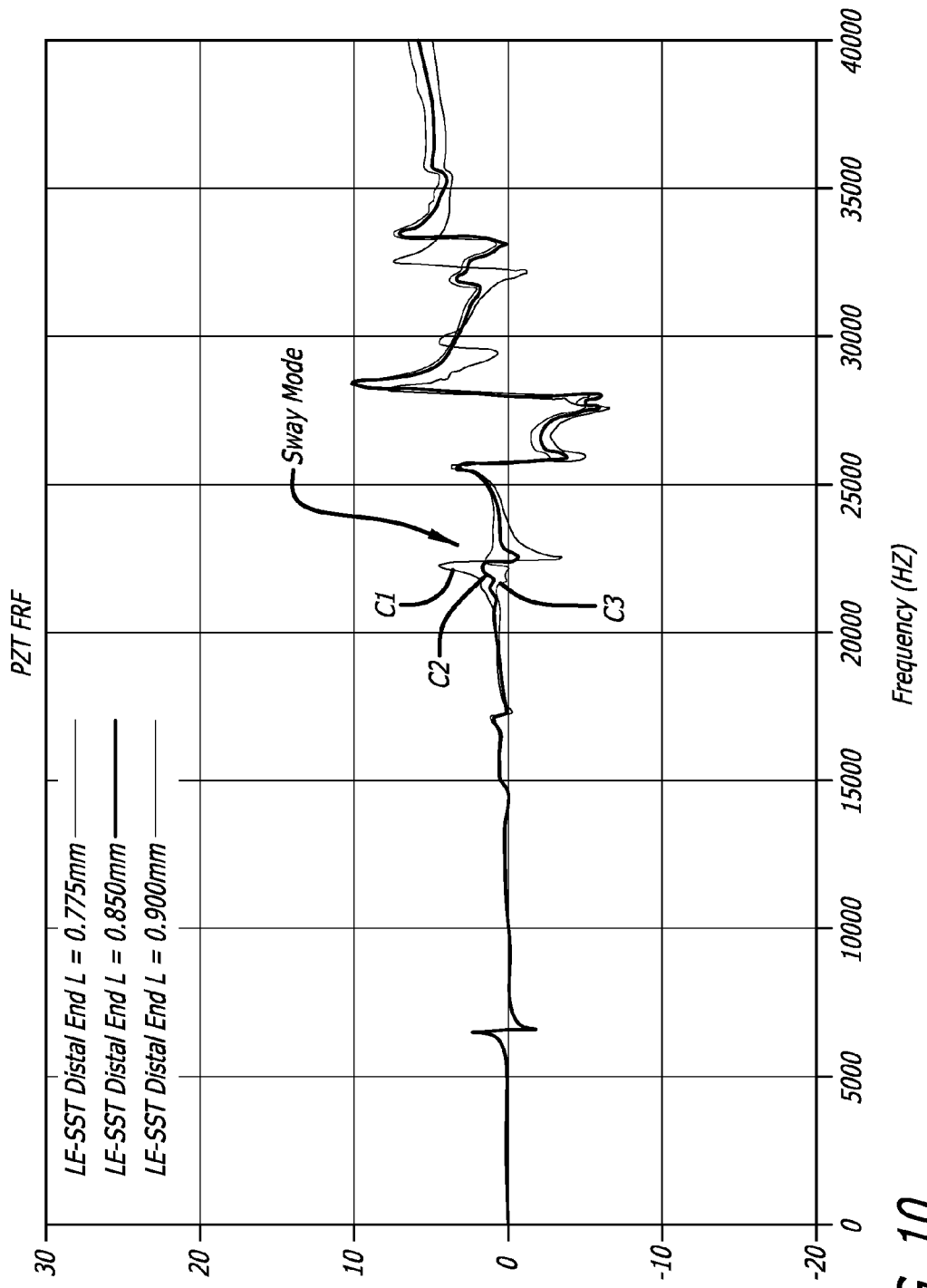
FIG. 10 is a graph of a frequency response function of the suspension of FIGS. 7 and 8 according to a simulation.

FIG. 10 is a graph of a frequency response function of the suspension of FIG. 7 and FIG. 8 according to a simulation. Three different lengths L of the moment balancer are represented by three corresponding curves in the graph.

A curve of the graph designated C1 corresponds to a scenario where a length L of the distal end of the moment balancer is 0.775 mm. In this case, the suspension exhibits a relatively high sway gain due to $I_1$ being greater than $I_2$.

A curve of the graph designated C2 corresponds to a scenario where a length L of the distal end of the moment balancer is 0.850 mm. In this case, the suspension exhibits a relatively low sway gain due to $I_1$ being substantially equal to $I_2$. Thus, extension of the gimbal tongue to serve as moment balancer 60 has resulted in the sway gain of the PZT FRF being reduced close to zero which is the desired result.

A curve of the graph designated C3 corresponds to a scenario where a length L of the distal end of the moment balancer is 0.900 mm. In this case, the suspension exhibits a relatively high sway gain due to $I_1$ being less than $I_2$. Thus, further elongation of the moment balancer has resulted in an increase in the sway gain of the PZT FRF.

Several advantages may be achieved through the use of a moment balancer as taught herein. First, implementations that use a T-shaped limiter or other shaped limiter may require the use of a specialized forming process during the suspension assembly process. Moreover, the use of such a limiter may introduce unexpected modes that exhibit high gain in the PZT FRF for the suspension. In contrast, a moment balancer may be incorporated into a suspension without the use of any specialized forming process, and might not introduce the unexpected modes referred to above. Second, since a moment balancer may be constructed of standard flexure materials of stainless steel, polyimide, and copper, the manufacture of a moment balancer may be readily incorporated into the flexure manufacturing process. It should be noted, however, that the current invention does not exclude the use of the T-shaped limiter or any other shaped limiter as the moment balancer.

The manner in which the length of a moment balancer is controlled may be different in different implementations. For example, the placement of the polyimide on the stainless steel may vary and/or the placement of the copper on the stainless steel may vary. Either one of these materials may be placed independently of the other.

Balancing of moments in accordance with the teachings herein may be accomplished in different ways in different embodiments. For example, rather than increase the mass $M_2$ of the flexure rear part, the mass $M_1$ of the flexure front part may be increased in order to reduce sway gain. This alternative approach may be used, for example, in scenarios where design constraints limit the length that can be used for the moment balancer.

Figure 1:
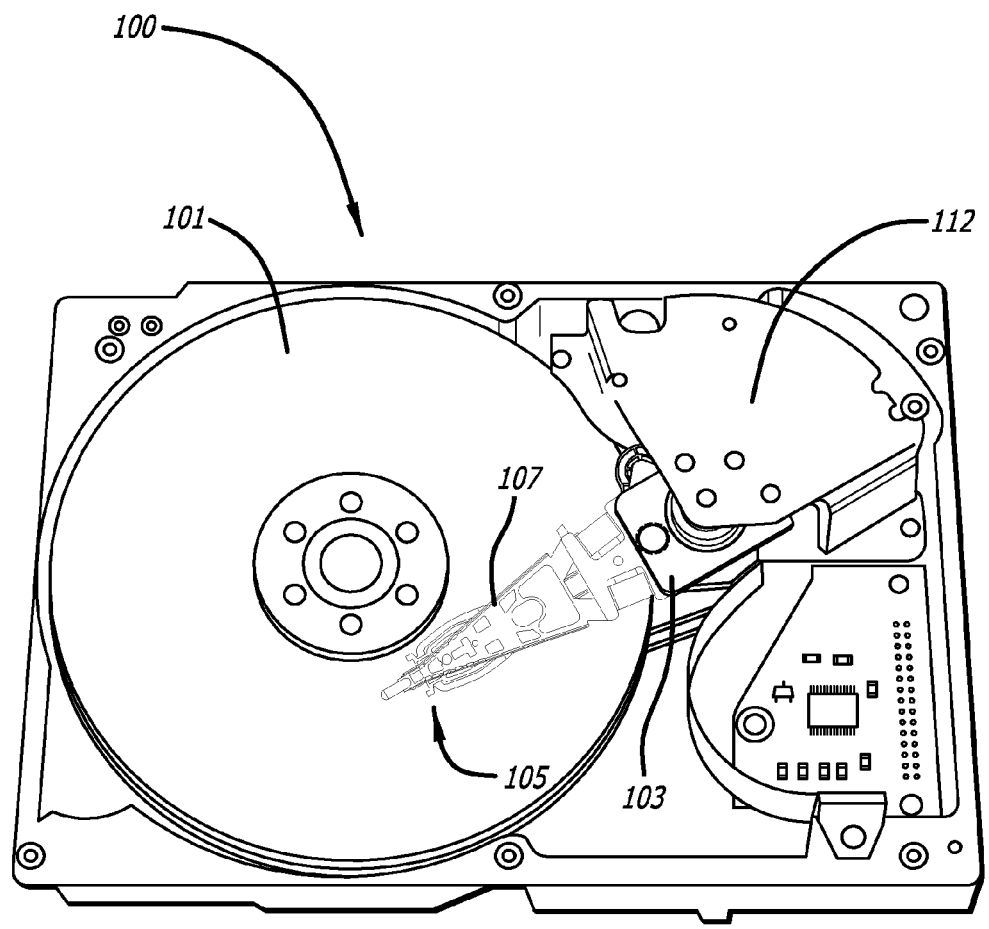
FIG. 1 is an oblique view of a prior art disk driving having a dual stage actuated suspension having PZTs mounted at the base plate.
Figure 2:
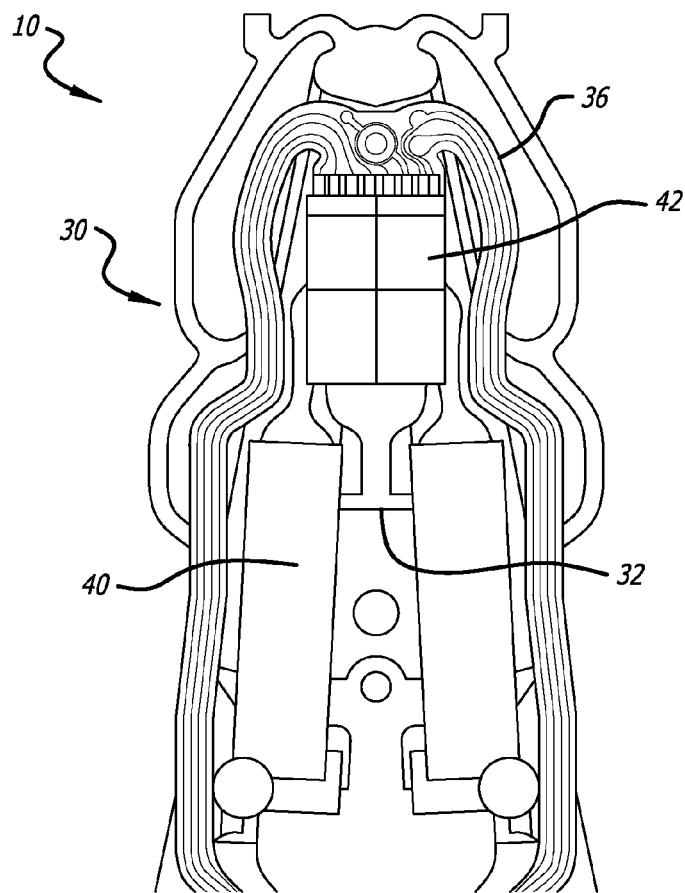
FIG. 2 is a bottom plan view of a prior suspension employing PZTs located at the flexure gimbal area.
Figure 3:
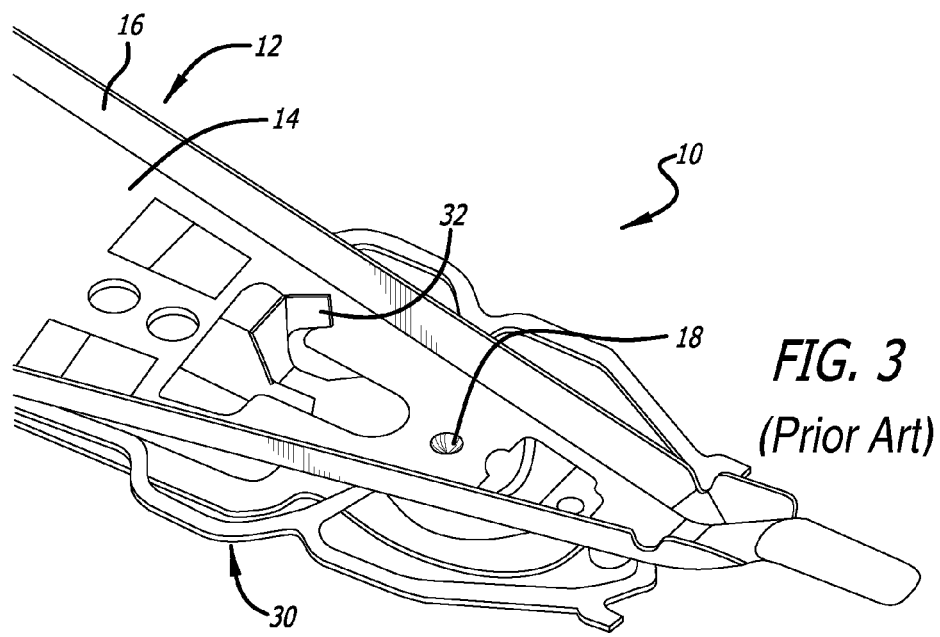
FIG. 3 is a top oblique view of the suspension of FIG. 2.
Figure 4:
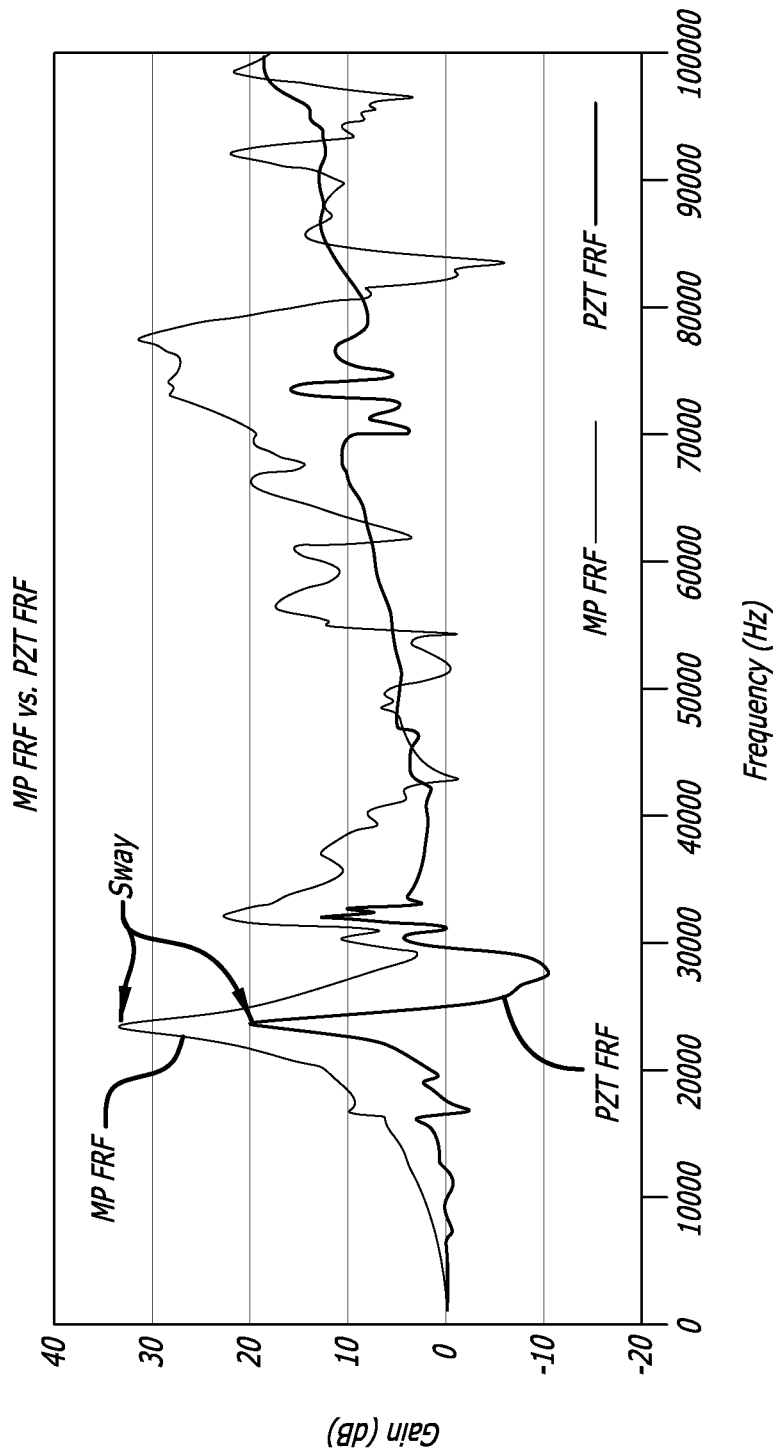
FIG. 4 is a graph of a frequency response function of the suspension of FIGS. 2 and 3 according to a simulation.
Figure 12:
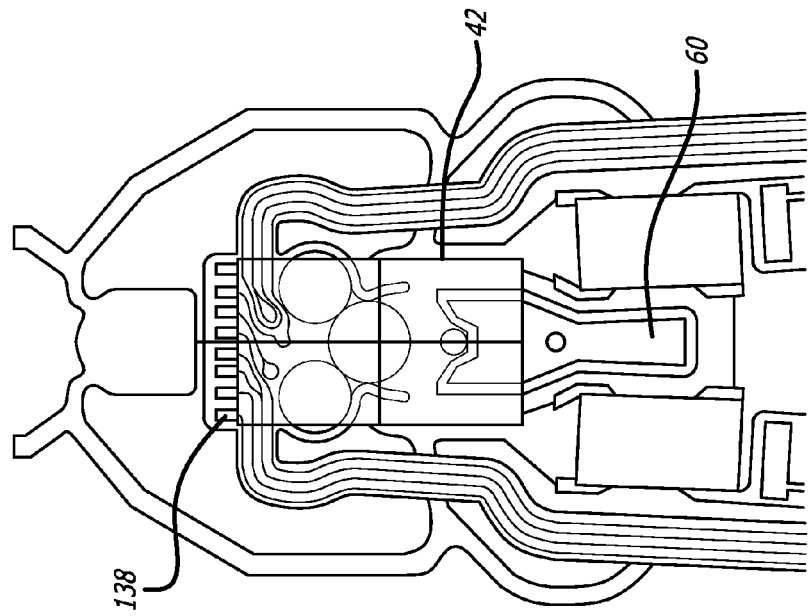
FIG. 12 is a bottom plan view of the suspension in FIG. 11.
Figure 11:
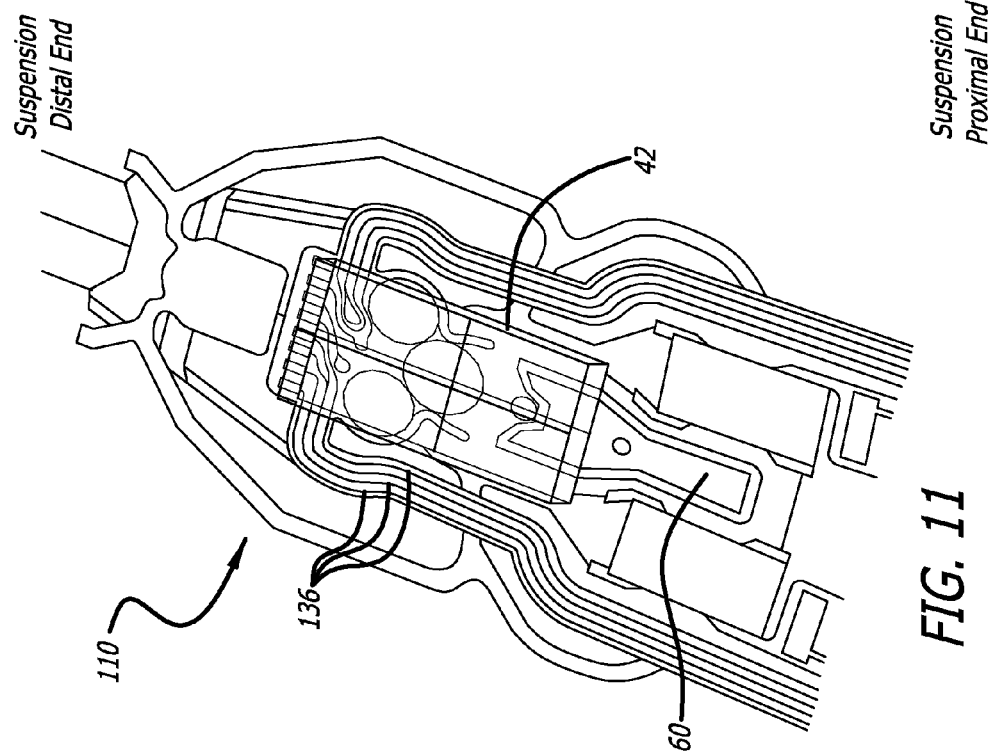
FIG. 11 is a bottom oblique view of a suspension including a flexure gimbal assembly in which electrical circuit traces run at least partially under the slider, and approach the slider contacts from a proximal end of the suspension according to an illustrative embodiment of the invention.

FIG. 11 is a bottom oblique view of a suspension 110 including a flexure gimbal assembly having an extended gimbal tongue that functions as a moment balancer 60. Additionally, according to another aspect of the invention, within the suspension's flexible electrical circuit at least some of the electrical circuit traces 136 extend or run at least partially under slider 42 and approach slider bond pads 138 from a proximal end of the suspension. Traces 136 typically carry data signals that run to and from head slider 42 as well as reference voltages from voltage sources and a ground reference. FIG. 12 is a bottom plan view of the suspension in FIG. 11. As shown in FIGS. 11 and 12, the circuit traces 136 in the area of slider bond pads 136 are re-routed at least partially under the flexure tongue under slider 42 in order to reduce the mass $m_1$ distal of the center of rotation of head slider 42. Bond pads 138 are at the ends of circuit traces 136, and constitute bonding pads to which the signal pads on the head slider are respectively electrically and physically connected. Circuit traces 136 underneath slider 42 approach the bond pads 138 from the proximal direction instead of from the distal direction as in the suspension of FIG. 2. Stated another way, at the places where circuit traces 136 leave their respectively associated bond pads 138, the electrical traces extend away from those bond pads in a proximal direction.

Figure 13:
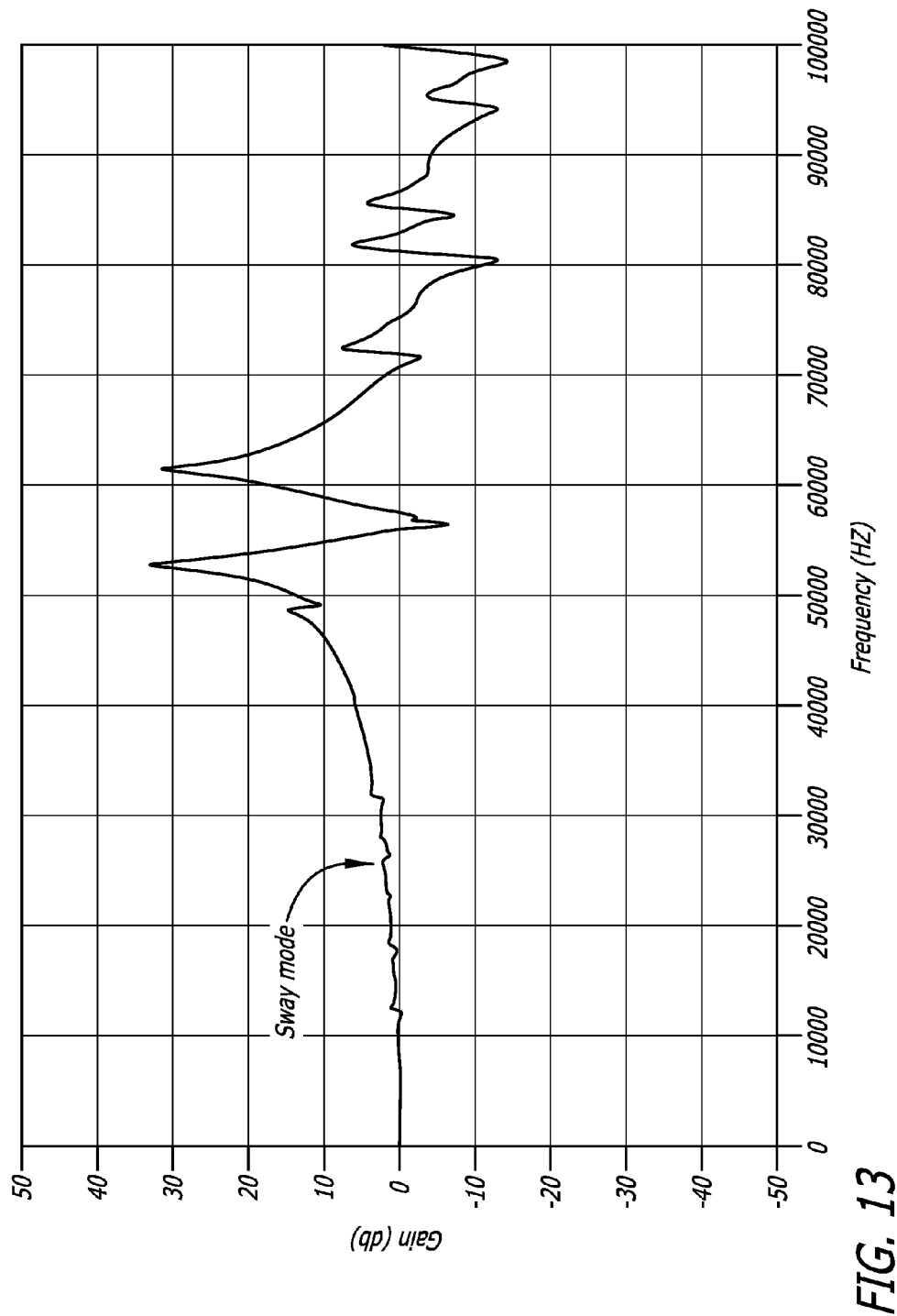
FIG. 13 is a graph of a frequency response function of the suspension of FIGS. 11 and 12 according to a simulation.

FIG. 13 is a graph of a frequency response function of the suspension of FIGS. 11 and 12 according to a simulation. As indicated, the sway mode peak is substantially reduced in this embodiment. The first major peak does not occur until approximately 52 kHz. The location of the first major peak has therefore been moved to a significantly higher frequency as desired.

Figure 14:
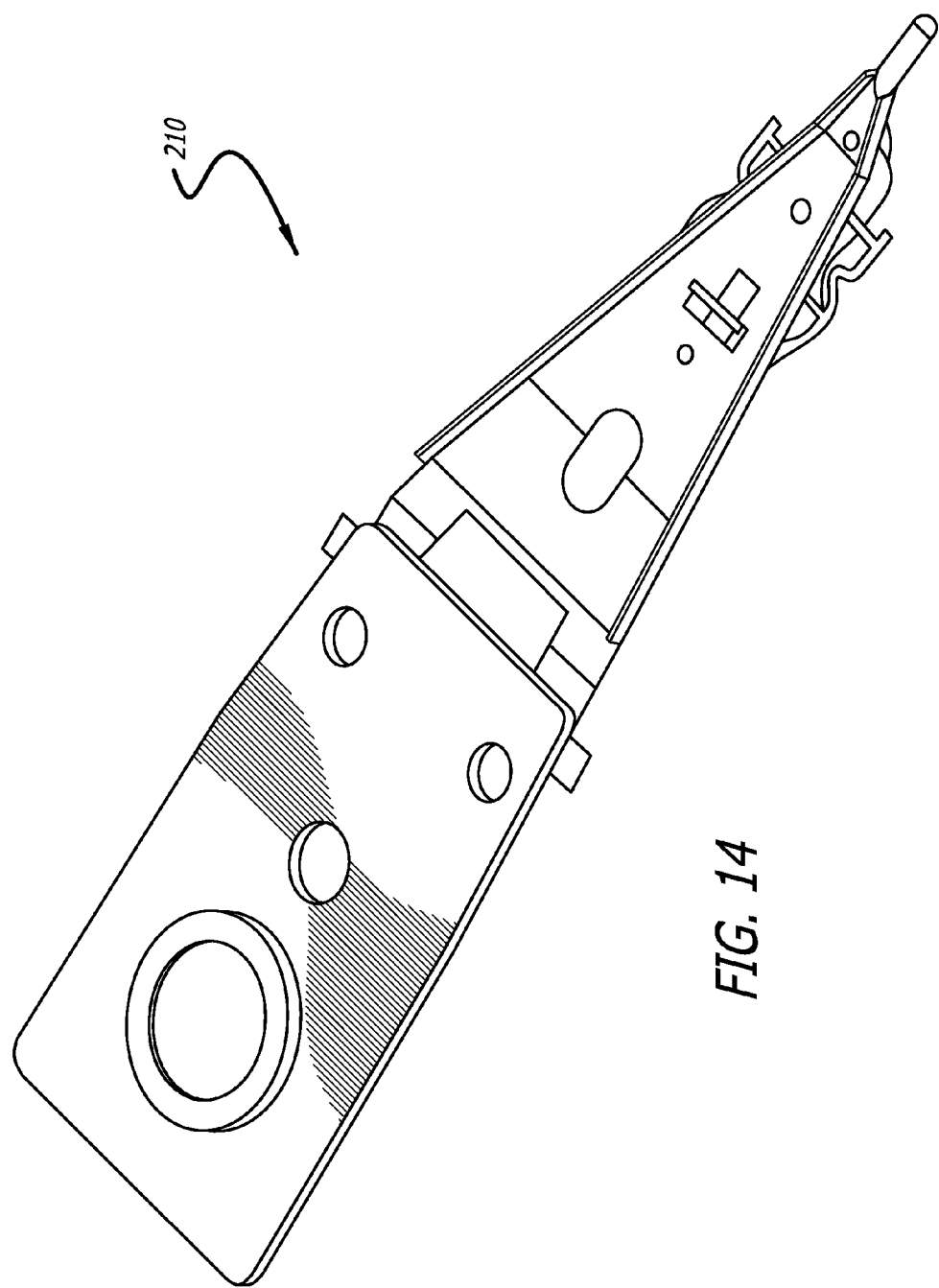
FIG. 14 is a top oblique view of a suspension including a flexure gimbal assembly where the flexure gimbal assembly incorporates a trace gimbal and is moment balanced according to another illustrative embodiment of the invention.
Figure 16:
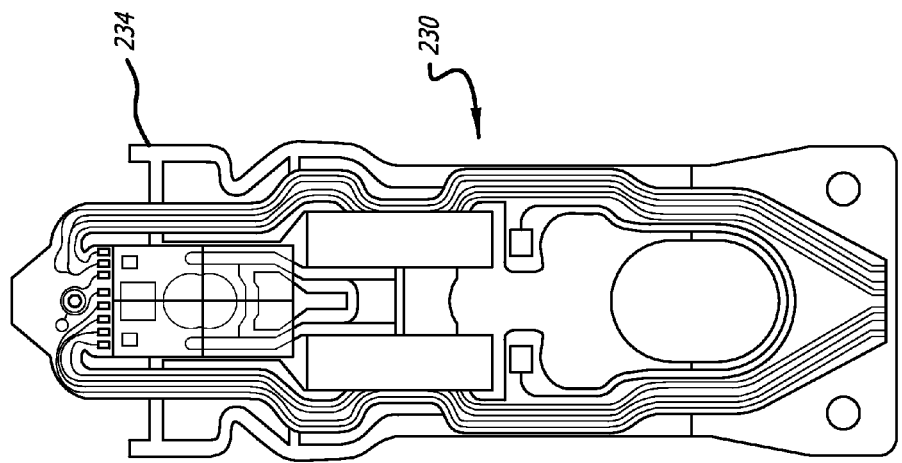
FIG. 16 is a bottom plan view of the flexure gimbal assembly of FIG. 15.
Figure 15:
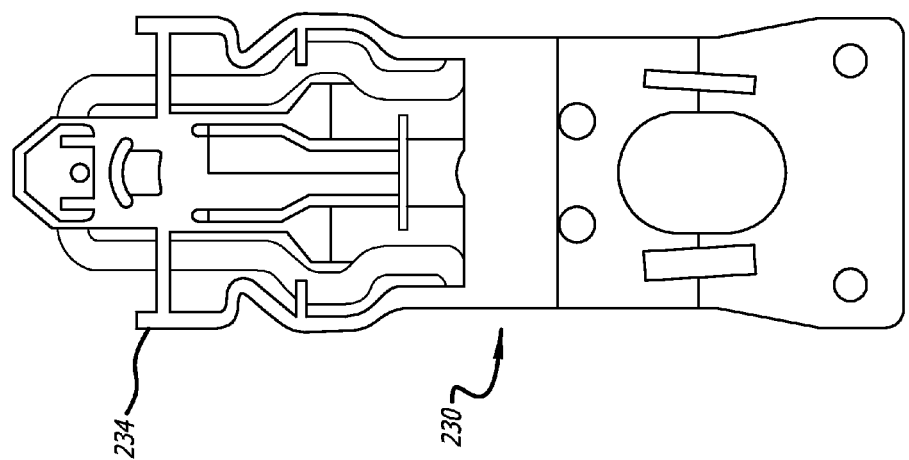
FIG. 15 is a top plan view of the flexure gimbal assembly that is incorporated into the suspension of FIG. 14.

FIG. 14 is a top oblique view of a suspension 210 including a flexure gimbal assembly where the flexure gimbal assembly 230 incorporates a trace gimbal 234 and is moment balanced according to another illustrative embodiment of the invention. FIG. 15 is a top plan view of flexure gimbal assembly 230 that is incorporated into the suspension of FIG. 14. FIG. 16 is a bottom plan view of flexure gimbal assembly 230 of FIG. 15. In the embodiment, suspension 210 incorporates a trace gimbal (TG) 234. This is in contrast to the ring-gimbal style shown in the embodiments of FIG. 7 and FIG. 11. By appropriately balancing the rotational moments, the sway gain can be effectively controlled for this TG design. A leading edge limiter may be employed for shock protection in this embodiment.

Figure 17:
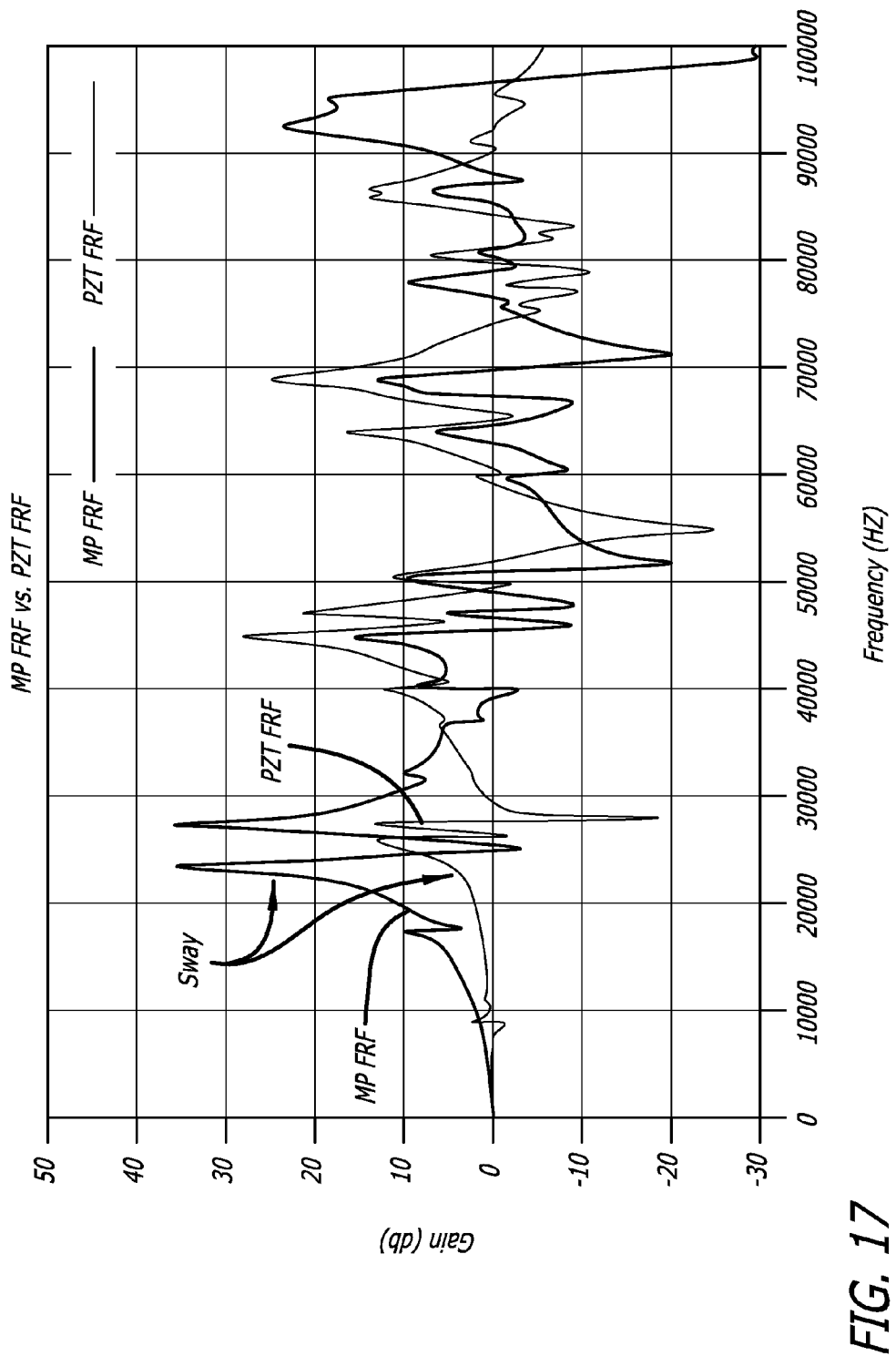
FIG. 17 is a graph of a frequency response function of the suspension of FIGS. 14-16 according to a simulation.

FIG. 17 is a graph of a frequency response function of the suspension of FIGS. 14-16 according to a simulation. As indicated, the sway mode peak of the PZR FRF is substantially reduced as compared to the sway mode peak of the MP FRF.

It will be understood that the terms "generally," "approximately," "about," and "substantially," as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A dual-stage actuated suspension for a disk drive, the suspension comprising:
   a load beam having a dimple;
   a head slider for writing data to, and reading data from, a rotating data storage medium;
   at least one microactuator arranged to affect rotational movement of the head slider about the load beam dimple;
   a flexure affixed to the load beam, the flexure having a gimbaled portion to which the head slider is affixed, the gimbaled portion comprising a first flexure section that is distal of the dimple and a second flexure section that is proximal of the dimple; and
   an electrical circuit having electrical traces for carrying electrical signals to and from the head slider and having slider bond pads to which the electrical traces and the head slider are electrically connected;
   wherein at places where the electrical traces leave the bond pads, those electrical traces extend away from the bond pads in a proximal direction; and
   wherein a first rotational moment about the dimple associated with the first flexure section and a second rotational moment about the dimple associated with the second flexure section are substantially balanced with respect to one another.

2. The suspension of claim 1 wherein the electrical traces run at least partially under the slider.

3. The suspension of claim 1 wherein:
   the first rotational moment of inertia is $I_1 = \int_0^{m_1} r_1^2 dm$; and
   the second rotational moment of inertia is $I_2 = \int_0^{m_2} r_2^2 dm$;
   where:
   $m_1$ and $m_2$ are masses of the first and second flexure sections, respectively; and
   $r_1$ and $r_2$ represent respective radii from a center of rotation of the head slider about the load beam dimple to each differential portion of masses $m_1$ and $m_2$.

4. The suspension of claim 1 wherein the flexure includes an extended gimbal tongue extending from underneath the head slider in a proximal direction, the extended gimbal tongue comprising stainless steel and at least one of an insulating material and copper therebetween.

5. The suspension of claim 1 wherein substantially balanced means balanced within 1%.

6. The suspension of claim 1 wherein substantially balanced means balanced within 5%.

7. The suspension of claim 1 wherein substantially balanced means balanced within 10%.

8. The suspension of claim 1 wherein substantially balanced means balanced within 20%.

9. A dual-stage actuated suspension for a disk drive, the suspension comprising:
   a load beam having a dimple;
   a head slider for writing data to, and reading data from, a rotating data storage medium;
   at least one microactuator arranged to affect rotational movement of the head slider about the load beam dimple; and
   a flexure affixed to the load beam, the flexure having a gimbaled portion to which the head slider is affixed, the gimbaled portion comprising a first flexure section that is distal of the dimple and a second flexure section that is proximal of the dimple;
   wherein:
   a first rotational moment about the dimple associated with the first flexure section and a second rotational moment about the dimple associated with the second flexure section are substantially balanced with respect to one another;
   the flexure includes an extended gimbal tongue extending from underneath the head slider in a proximal direction, the extended gimbal tongue comprising stainless steel and at least one of an insulating material and copper therebetween, the extended gimbal tongue including copper that is not electrically connected to any data signal to or from the head slider.

10. A dual-stage actuated suspension for a disk drive, the suspension comprising:
    a load beam having a dimple;
    a head slider for writing data to, and reading data from, a rotating data storage medium;
    at least one microactuator arranged to affect rotational movement of the head slider about the load beam dimple;
    a flexure affixed to the load beam, the flexure having a gimbaled portion to which the head slider is affixed, the gimbaled portion comprising a first flexure section that is distal of the dimple and a second flexure section that is proximal of the dimple;
    wherein:
    a first rotational moment about the dimple associated with the first flexure section and a second rotational moment about the dimple associated with the second flexure section are substantially balanced with respect to one another;
    the flexure includes an extended gimbal tongue extending from underneath the head slider in a proximal direction, the extended gimbal tongue comprising stainless steel and at least one of an insulating material and copper therebetween; and the suspension is a ring gimbal type suspension, and the suspension has no limiter comprising a bent portion of the flexure proximal of the head slider that limits vertical displacement of the head slider.

11. A dual-stage actuated suspension for a disk drive, the suspension comprising:
   a beam portion;
   a head slider for writing data to, and reading data from, a rotating data storage medium;
   at least one microactuator arranged to rotate the head slider about a center of rotation thereof; and
   a flexure affixed to the beam portion, the flexure having a gimbaled portion to which the head slider is affixed, the gimbaled portion comprising a first flexure section that is distal of the center of rotation and a second flexure section that is proximal of the center of rotation;
   wherein a first rotational moment about the center of rotation associated with the first flexure section and a second rotational moment about the center of rotation associated with the second flexure section are substantially balanced with respect to one another; and
   wherein the head slider is mounted to a gimbal tongue, and the gimbal tongue includes copper that is not electrically connected to any data signal to or from the head slider.

12. The suspension of claim 11 wherein substantially balanced means balanced within 5%.

13. The suspension of claim 11 wherein substantially balanced means balanced within 10%.

14. A dual-stage actuated suspension for a disk drive, the suspension comprising:
   a beam portion having a dimple;
   a head slider for writing data to, and reading data from, a rotating data medium;
   at least one microactuator arranged to affect rotational movement of the head slider about the dimple;
   a flexure affixed to the beam portion, the flexure having a gimbaled portion to which the head slider is affixed, the gimbaled portion comprising a first flexure section that is distal of the dimple and a second flexure section that is proximal of the dimple; and
   an electrical circuit having electrical traces for carrying electrical signals to and from the head slider and having slider bond pads to which the electrical traces and the head slider are electrically connected;
   wherein at least some of the electrical traces extend at least partially underneath the head slider; and
   wherein at places where the electrical traces leave the bond pads, those electrical traces extend away from the bond pads in a proximal direction.

15. The suspension of claim 14 wherein the suspension has no limiter comprising a bent portion of the flexure that limits vertical displacement of the head slider.

16. A dual-stage actuated suspension for a disk drive, the suspension comprising:
   a beam portion having a dimple;
   a head slider for writing data to, and reading data from, a rotating data medium;
   at least one microactuator arranged to affect rotational movement of the head slider about the dimple;
   a flexure affixed to the beam portion, the flexure having a gimbaled portion to which the head slider is affixed, the gimbaled portion comprising a first flexure section that is distal of the dimple and a second flexure section that is proximal of the dimple; and
   an electrical circuit having electrical traces for carrying, electrical signals to and from the head slider and having slider bond pads to which the electrical traces and the head slider are electrically connected;
   wherein:
   at least some of the electrical traces extend at least partially underneath the head slider; and
   the second flexure section includes copper that is not electrically connected to any data signal to or from the head slider and is not connected to any voltage source carried by a flexible electrical circuit of the suspension.

\* \* \* \* \*